(No Model.)
M. C. F. AGÜERO.
FISH SCALER.
No. 554,637.    Patented Feb. 11, 1896.
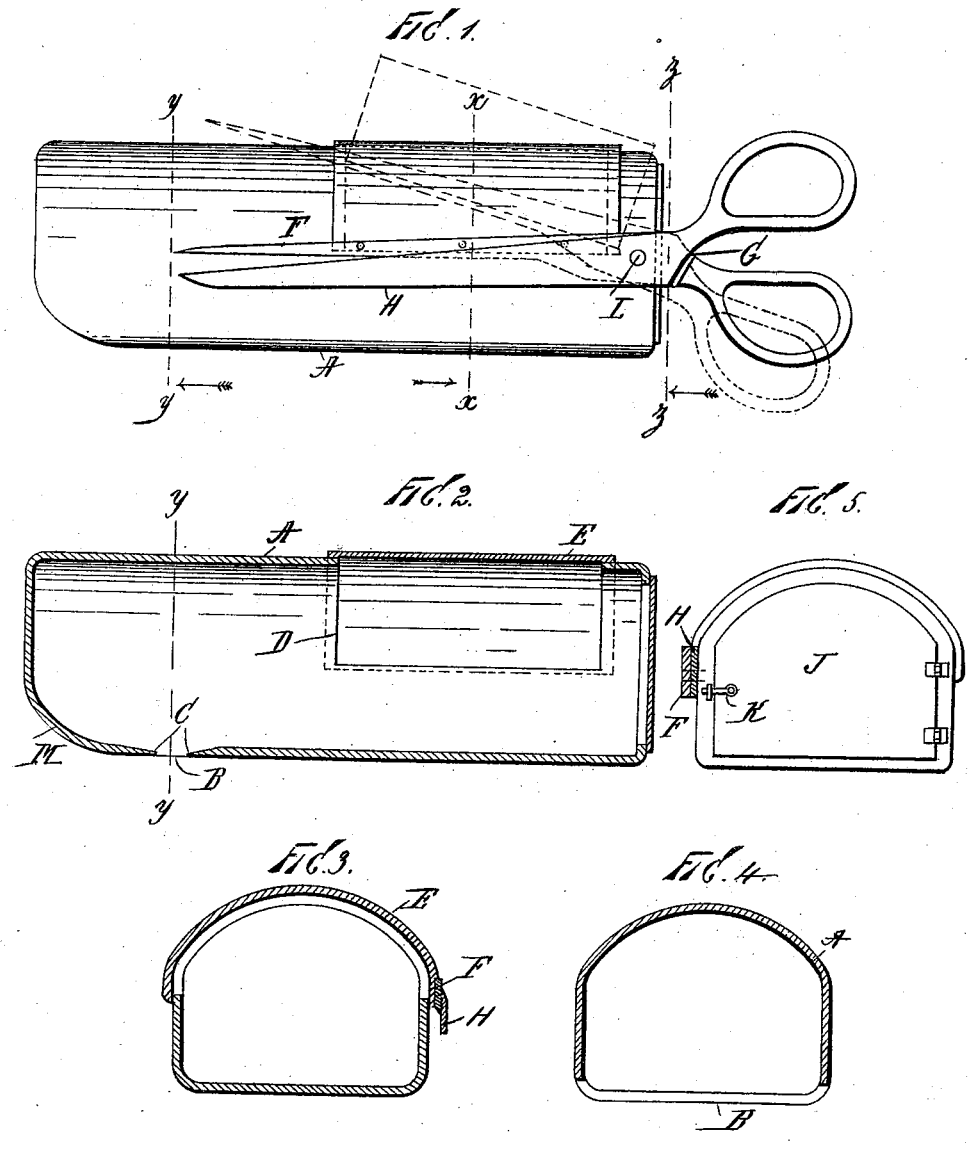
WITNESSES:
John Buckler
C. Gerst
INVENTOR
Mary C. F. Agüero
BY
Edgar Tate
ATTORNEYS

UNITED STATES PATENT OFFICE.

MARY C. F. AGÜERO, OF NEW YORK, N. Y.

FISH-SCALER.

SPECIFICATION forming part of Letters Patent No. 554,637, dated February 11, 1896.

Application filed May 13, 1895. Serial No. 549,076. (No model.)

*To all whom it may concern:*

Be it known that I, MARY CECILIA FERRIGAN AGÜERO, a citizen of the United States, and a resident of New York, county of New York, and State of New York, have invented certain new and useful Improvements in Fish-Scalers, of which the following is a specification, reference being had to the accompanying drawings, forming a part thereof, in which similar letters of reference indicate corresponding parts.

My invention relates to means for scaling fish; and the object thereof is to provide a simple and effective device of this class by which the fish can be easily and readily scaled, my said improvement being also provided with means for trimming the fish or cutting off its head and tail, and the construction and arrangement thereof being such that the scales and trimmings are collected thereby.

The invention is fully disclosed in the following specification, of which the accompanying drawings form a part, in which—

Figure 1 is a side elevation of my improvement, showing also the method of operating parts thereof; Fig. 2, a vertical longitudinal section thereof; Fig. 3, a transverse section on the line $x\,x$ of Fig. 1; Fig. 4, a similar section on the line $y\,y$ of Figs. 1 and 2, and Fig. 5 a sectional end view on the line $z\,z$ of Fig. 1.

In the practice of my invention I provide an oblong box or casing A, preferably flat upon its lower side and curved or convex in cross-section on its upper side, and provided also in its lower side with a transverse slot B, the upper portion of the sides of said slot being cut away, forming approximately knife edges C, as shown.

The upper side of the casing A near one end thereof is cut out, or cut away, as shown at D, Fig. 1, and the opening thus formed is covered by a section E of the general form in cross-section of the upper part of said casing, as shown in Figs. 1 and 3, and said section or cover is rigidly secured to one arm or blade, F, of a pair of shears G, the other arm or blade, H, of which is rigidly secured to the casing A, as shown in said Fig. 1. One end of the casing A is also provided with a hinged door J, as shown in Fig. 5, provided with latching device K, as is also shown in said figure.

In operation the case A is grasped in the hand and is rubbed quickly back and forth over the fish, by which operation the scales are removed therefrom by the edges C of the slot B, as will be readily understood, the scale being deposited within the casing, and this process may be continued until the scales are all removed from the fish, the latter being held in such a position as to admit of the casing being passed over the entire body thereof.

When the scales have been removed as described, the tail and head of the fish may be cut off by means of the shears G, in the operation of which the hinged section E is raised, as shown in Fig. 1 in dotted lines, and the head and tail of the fish will be deposited within the casing A, after which the contents of the casing may be removed through or by means of the hinged door J.

It will thus be seen that I accomplish the object of my invention by means of a device which is simple in construction and operation which is perfectly adapted to produce the result for which it is intended.

The shears G need not be rigidly secured to the casing, but may be pivoted thereto by means of a pivotal plug or pin L, (shown in Fig. 1,) which also forms a pivotal connection for the separate arms or blades of the shears, as will be readily understood, and I also prefer to form the lower corners of the casing A opposite the pivotal connection of the shears curved or rounded, as shown at M in Fig. 2; but this last feature is not essential to the construction.

Having fully described my invention, I claim and desire to secure by Letters Patent—

1. A device for scaling and trimming a fish, comprising a pair of shears, an oblong casing secured to one blade of the shears and having a transverse slot in its lower side provided with cutting edges, and a section carried by the other blade adapted to close an opening in the top of the casing, substantially as described.

2. In a device of the character described, the combination with a pair of shears, of a box or casing secured on one blade thereof and provided with a transverse slot in its lower side and an opening in the upper side, and a section secured to the other blade and adapted to cover the opening in the upper side of the casing, substantially as described.

In testimony that I claim the foregoing as my invention I have signed my name, in presence of two witnesses, this 11th day of May, 1895.

MARY C. F. AGÜERO.

Witnesses:
PERCY T. GRIFFITH,
L. M. MULLER.